United States Patent
Lee et al.

(10) Patent No.: US 7,956,110 B2
(45) Date of Patent: Jun. 7, 2011

(54) NON-HALOGEN FLAMEPROOF RESIN COMPOSITION

(75) Inventors: Min Soo Lee, Ansan-si (KR); Beom Jun Joo, Seoul (KR); Byun Kun Lee, Gunpo-si (KR); Sang Hyun Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/776,590

(22) Filed: May 10, 2010

(65) Prior Publication Data

US 2010/0216921 A1    Aug. 26, 2010

Related U.S. Application Data

(63) Continuation-in-part of application No. PCT/KR2007/007023, filed on Dec. 31, 2007.

(30) Foreign Application Priority Data

Nov. 19, 2007    (KR) .................... 10-2007-0117959

(51) Int. Cl.
*C08K 5/5357* (2006.01)
(52) U.S. Cl. ........................................ 524/117
(58) Field of Classification Search .................. 524/117
See application file for complete search history.

(56) References Cited

U.S. PATENT DOCUMENTS

| | | | |
|---|---|---|---|
| 4,520,152 A | 5/1985 | Axelrod |
| 7,365,114 B2 | 4/2008 | Hong et al. |
| 7,781,516 B2 | 8/2010 | Bae et al. |
| 2002/0137824 A1 | 9/2002 | Hong et al. |
| 2002/0161081 A1 | 10/2002 | Jang et al. |
| 2006/0189729 A1 | 8/2006 | Bae et al. |
| 2007/0032579 A1 | 2/2007 | Ku et al. |

FOREIGN PATENT DOCUMENTS

| | | |
|---|---|---|
| JP | 11-199721 A | 7/1999 |
| KR | 10-2006-0003854 A | 1/2006 |
| KR | 10-2007-0017887 A | 2/2007 |
| WO | 2009/066831 A1 | 5/2009 |

OTHER PUBLICATIONS

Costa, et al., "Flame-Retardant Properties of Phenol-Formaldehyde-Type Resins and Triphenyl Phosphate in Styrene-Acrylonitrile Copolymers," Journal of Applied Polymer Science, (1998) vol. 68, Issue 7, pp. 1067-1076.
International Search Report in counterpart International Application No. PCT/KR2007/007023, dated Jul. 28, 2008.
Extended European Search Report in counterpart European Application No. 07860800 dated Sep. 30, 2010.

*Primary Examiner* — Peter Szekely
(74) *Attorney, Agent, or Firm* — Summa, Additon & Ashe, P.A.

(57) ABSTRACT

A non-halogen flameproof resin composition is disclosed. The resin composition includes a base resin including (A) about 80 to about 99% by weight of an aromatic vinyl resin and (B) about 1 to about 20% by weight of a polyphenylene ether; and (C) about 0.5 to about 30 parts by weight of a cyclic t-butyl phosphonate, based on about 100 parts by weight of the base resin comprising (A) and (B).

9 Claims, No Drawings

NON-HALOGEN FLAMEPROOF RESIN COMPOSITION

CROSS-REFERENCE TO RELATED APPLICATIONS

This application is a continuation-in-part of International Application No. PCT/KR2007/007023, filed Dec. 31, 2007, pending, which designates the U.S., published as WO 2009/066831, and is incorporated herein by reference in its entirety, and claims priority therefrom under 35 USC Section 120. This application also claims priority under 35 USC Section 119 from Korean Patent Application No. 10-2007-0117959, filed Nov. 19, 2007, in the Korean Intellectual Property Office, the entire disclosure of which is also incorporated herein by reference.

FIELD OF THE INVENTION

The present invention relates to a non-halogen flameproof resin composition.

BACKGROUND OF THE INVENTION

Generally, styrenic resins have good processability and mechanical properties, and thus have been used in the production of exterior parts for many electronic goods. However, styrenic resins can combust and are not fire resistant. Thus, styrenic resins can ignite and spread fire from an external ignition source. Accordingly, styrenic resins are subject to various mandatory controls on flammability for safety reasons in many countries, including the United States, Japan, and Europe, and are required to have high flame retardancy to meet the Underwriter's Laboratories Standard for use in the housing of electric appliances.

One well known and widely used method for imparting flame retardancy is to add halogen-containing flame retardants and antimony compounds to rubber-reinforced styrenic resin. Such halogen-containing compounds include polybromodiphenyl ether, tetrabromobisphenol A, bromine-substituted epoxy compounds, chlorinated polyethylene and the like. Antimony trioxide and antimony pentoxide are mainly used as the antimony compounds.

Imparting flame retardancy by using halogen and antimony compounds together has the advantages of ease in obtaining flame retardancy and little deterioration of physical properties. However, hydrogen halide produced during processing can have a harmful effect on health. In particular, the main halogen-containing flame retardant, polybromodiphenyl ether, can produce very toxic gas such as dioxin or furan. Hence, efforts have focused on the development of methods for imparting flame retardancy without using a halogen-containing compound.

Because rubber-modified styrenic resin generally has little remaining char during combustion, it is hard to impart flame retardancy to it in its solid state (Journal of Applied Polymer Science, 1998, vol. 68, p. 1067). Therefore, adding a char forming agent to a rubber-modified styrenic resin can promote desirable flame retardancy.

U.S. Pat. No. 4,520,152 discloses flame retardant compositions including polyphenylene ether resin, a styrene resin and a cyclic phosphonate. However, it has a disadvantage in that it is necessary to use 20 wt % or more of polyphenylene ether.

Japanese Patent Laid-Open No. 11-199721 discloses a flame-retardant propylene resin composition including a propylene resin, a nitrogenous thermoplastic resin, phosphorus nitrogen flame retardant, and modified polypropylene. However, it fails to disclose a flame retardant method for a styrenic resin or styrenic resin-based blend.

SUMMARY OF THE INVENTION

Accordingly, the present inventors have developed a non-halogen flameproof resin composition that can have improved flame retardancy and impact strength and as well as stability against fire by adding cyclic t-butyl phosphonate as a flame retardant to a base resin comprising an aromatic vinyl resin and polyphenylene ether.

The present invention thus can provide a non-halogen flameproof resin composition having stability against fire. The non-halogen flameproof resin composition of the invention can also be environmentally friendly and can minimize and/or eliminate generation of toxic pollutants during the preparation or combustion of the resin because it does not include halogen atoms. In addition, the flame retardant resin composition can have good moldability because it can include a reduced amount of polyphenylene ether in the resin composition. Further, the flame retardant resin composition can have good impact strength.

The non-halogen flameproof resin composition of the present invention includes a base resin including (A) about 80 to about 99% by weight of an aromatic vinyl resin, and (B) about 1 to about 20% by weight of a polyphenylene ether resin; and (C) about 0.5 to about 30 parts by weight of a cyclic t-butyl phosphonate compound, based on about 100 parts by weight of the base resin comprising (A) and (B).

In an embodiment of the present invention, the aromatic vinyl resin may be a polymer comprising a rubber and an aromatic monoalkenyl monomer.

In another embodiment of the present invention, the aromatic vinyl resin may be a polymer comprising a rubber, an aromatic monoalkenyl monomer and one or more monomers copolymerizable with the aromatic monoalkenyl monomer. The copolymerizable monomer(s) may be alkyl ester monomers, unsaturated nitrile monomers or mixtures thereof.

In exemplary embodiments of the present invention, the polyphenylene ether resin (B) may be poly(2,6-dimethyl-1,4-phenylene)ether.

In exemplary embodiments of the present invention, the cyclic t-butyl phosphonate compound (C) can be represented by the following chemical formula 1.

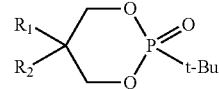

[Chemical Formula 1]

wherein each $R_1$ and $R_2$ is independently hydrogen, $C_1$-$C_6$ alkyl or $C_6$-$C_{10}$ aryl.

In the present invention, the flame retardant resin composition may further include (D) an aromatic phosphoric ester compound.

Additionally, the flame retardant resin composition of the present invention may further include one or more other additives such as plasticizers, lubricants, heat stabilizers, anti-dripping agents, antioxidants, compatibilizers, light-stabilizers, pigments, dyes, inorganic fillers and the like. Those additives may be used alone or in combination with one another.

A more detailed description of each of the components of the resin composition according to various embodiments follows.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Aromatic Vinyl Resin

The aromatic vinyl resin (A) used in the resin composition of the present invention is a polymer including a rubber, an aromatic monoalkenyl monomer and optionally a monomer copolymerizable with the aromatic monoalkenyl monomer.

In an embodiment of the present invention, the aromatic vinyl resin may be a polymer including a rubber and an aromatic monoalkenyl monomer.

In another embodiment of the present invention, the aromatic vinyl resin may be a polymer including a rubber, an aromatic monoalkenyl monomer and a monomer polymerizable with the aromatic monoalkenyl monomer. Exemplary polymerizable monomers may include without limitation alkyl ester monomers, unsaturated nitrile monomers, and the like, and mixtures thereof.

Exemplary rubbers may include without limitation diene-rubbers such as polybutadiene, poly(styrene-butadiene), poly(acrylonitrile-butadiene) and the like; saturated rubbers in which hydrogen is added to the diene rubbers; isoprene rubbers; alkyl acrylate rubbers; ethylene-propylene-diene terpolymers (EPDM); ethylene-propylene rubbers; and the like. In exemplary embodiments, polybutadiene, poly(styrene-butadiene), isoprene, and/or alkyl acrylate rubbers may be used. The rubbers may be used alone or in combination with one another.

In the present invention, the rubber may be used in an amount of about 3 to about 30 wt %, for example about 5 to about 15 wt %, based on about 100 wt % of the aromatic vinyl resin (A). In some embodiments, the rubber may be used in an amount of about 3, 4, 5, 6, 7, 8, 9, 10, 11, 12, 13, 14, 15, 16, 17, 18, 19, 20, 21, 22, 23, 24, 25, 26, 27, 28, 29, or 30 wt %, based on about 100 wt % of the aromatic vinyl resin (A).

In exemplary embodiments, the rubber can have a particle size of about 0.1 to about 4.0 μm in order to render optimum properties in the blend of the aromatic vinyl resin (A) and the polyphenylene ether (B).

The aromatic monoalkenyl monomer may be a styrenic monomer. Exemplary styrenic monomers may include without limitation styrene, α-methyl styrene, o-, m- or p-methyl styrene, ethyl styrene, isobutyl styrene, tert-butyl styrene and the like, and mixtures thereof. In exemplary embodiments, styrene is used. The aromatic monoalkenyl monomer can be co-polymerized with rubber in an amount of about 70 to about 97 wt %, for example about 85 to about 95 wt %, based on about 100 wt % of the aromatic vinyl resin (A). In some embodiments, the aromatic monoalkenyl monomer can be co-polymerized with rubber in an amount of about 70, 71, 72, 73, 74, 75, 76, 77, 78, 79, 80, 81, 82, 83, 84, 85, 86, 87, 88, 89, 90, 91, 92, 93, 94, 95, 96, or 97 wt %, based on about 100 wt % of the aromatic vinyl resin (A).

In exemplary embodiments, other monomers copolymerizable with the aromatic monoalkenyl monomers may also be employed. Exemplary monomers which may be copolymerized with the aromatic monoalkenyl monomers may include without limitation alkyl ester monomers, unsaturated nitrile monomers, and the like, and mixtures thereof. In exemplary embodiments, monomers such as acrylonitrile, acrylic acid, methacrylic acid, maleic anhydride, N-substituted maleimide and the like can be added to the aromatic vinyl resin in order to impart physical properties such as chemical resistance, processability and thermal resistance. The monomer copolymerizable with the aromatic monoalkenyl monomer may be used in an amount of about 40 wt % or less, based on about 100 wt % of the aromatic vinyl resin (A). In some embodiments, the monomer copolymerizable with the aromatic monoalkenyl monomer may not be present (0 amount) or may be used in an amount greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %, based on about 100 wt % of the aromatic vinyl resin (A).

The aromatic vinyl resin (A) can be prepared by methods such as bulk polymerization, suspension polymerization, emulsion polymerization or combinations thereof. Among them, bulk polymerization may be used.

The aromatic vinyl resin (A) can be polymerized by thermal polymerization with or without using initiators. Exemplary initiators may include without limitation peroxide initiators such as benzoyl peroxide, t-butyl hydroperoxide, acetyl peroxide, cumene hydroperoxide and the like; azo initiators such as azobisisobutyronitrile; and the like, and mixtures thereof.

In the present invention, the base resin including (A) and (B) can include the aromatic vinyl resin (A) in an amount of about 80 to about 99% by weight, for example about 80 to about 90% by weight. In some embodiments, the base resin may include about 80, 81, 82, 83, 84, 85, 86, 87, 88, 89, 90, 91, 92, 93, 94, 95, 96, 97, 98, or 99% by weight of aromatic vinyl resin (A).

(B) Polyphenylene Ether

Since the resin including only the rubber-reinforced styrenic resin (A) does not have sufficient flame retardancy and thermal resistance, the present invention includes polyphenylene ether (B) in the base resin.

Examples of suitable polyphenylene ether resins can include without limitation poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene)ether, and copolymer of poly(2,6-dimethyl-1,4-phenylene)ether and poly(2,3,5-triethyl-1,4-phenylene)ether, and the like, and mixtures thereof. Among these, poly(2,6-dimethyl-1,4-phenylene)ether is most preferable.

The degree of polymerization of the polyphenylene ether (B) is not limited specifically, but can vary depending on factors such as heat-stability or processability of the resin composition. The intrinsic viscosity of the polyphenylene ether can be in the range of about 0.2 to about 0.8 measured in chloroform solvent at 25° C.

The base resin including (A) and (B) can include polyphenylene ether (B) in an amount of about 1 to about 20% by weight, for example about 10 to about 20% by weight. In some embodiments, the base resin may include about 1, 2, 3, 4, 5, 6, 7, 8, 9, 10, 11, 12, 13, 14, 15, 16, 17, 18, 19, or 20% by weight of the polyphenylene ether (B). Using less than about 1% by weight can deteriorate flame retardancy, while using more than about 20% by weight may degrade moldability.

(C) Cyclic t-butyl Phosphonate

The cyclic t-butyl phosphonate compounds of the present invention are cyclic t-butyl phosphonate compounds represented by the chemical formula 1 or mixtures thereof.

[Chemical Formula 1]

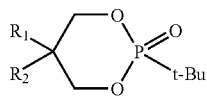

wherein $R_1$ and $R_2$ are each independently hydrogen, $C_1$-$C_6$ alkyl or $C_6$-$C_{10}$ aryl.

The cyclic t-butyl phosphonate may be prepared by reflux reacting t-butyl phosphonic dichloride with a diol-based compound in the presence of a base. In an exemplary embodiment, one equivalent of the t-butyl phosphonic dichloride is applied to one equivalent of the diol-based compound and refluxed at about 80° C. to about 200° C., for example about 100° C. to about 150° C., for about 5 to about 20 hours, for example for about 7 to about 15 hours, in the presence of base and solvent. The base may be triethylamine and the solvent may be a conventional organic solvent such as toluene.

The cyclic t-butyl phosphonate can be used in an amount of about 0.5 to about 30 parts by weight, for example about 5 to about 25 parts by weight, and as another example about 10 to about 25 parts by weight, based on about 100 parts by weight of the base resin including resins (A) and (B). In some embodiments, the cyclic t-butyl phosphonate may be used in an amount of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, based on about 100 parts by weight of the base resin including resin s (A) and (B). When the cyclic t-butyl phosphonate is used in an amount less than about 0.5 parts by weight, desired flame retardancy may not be achieved, and when used in an amount more than about 30 parts by weight, the mechanical properties may decrease.

(D) Aromatic Phosphoric Ester Compound

The flame retardant resin composition of the present invention may optionally include aromatic phosphoric ester compounds. The aromatic phosphoric ester compounds can be represented by the following chemical formula 2.

[Chemical Formula 2]

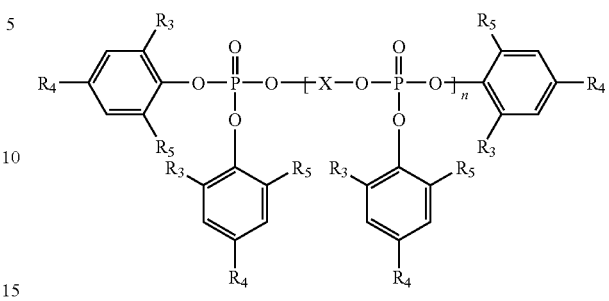

wherein $R_3$, $R_4$, and $R_5$ are each independently hydrogen or $C_1$-$C_4$ alkyl, X is $C_6$-$C_{20}$ aryl or $C_1$-$C_4$ alkyl-substituted $C_6$-$C_{20}$ aryl, and n is about 0 to about 4.

In the above formula, X can be a derivative of a dialcohol such as resorcinol, hydroquinol, bisphenol-A and the like. Where n is 0, compounds represented by chemical formula 2 include triphenyl phosphate, tri(2,6-dimethyl)phosphate, and the like, and where n is 1, compounds represented by chemical formula 2 include resorcinol bis(diphenyl)phosphate, resorcinol bis(2,6-dimethyl phenyl)phosphate, resorcinol bis (2,4-ditertiary butyl phenyl)phosphate, hydroquinol bis(2,6-dimethyl phenyl)phosphate, hydroquinol bis(2,4-ditertiary butyl phenyl)phosphate, and the like. The aromatic phosphoric ester compound (D) can be used alone or in combination with one another.

The aromatic phosphoric ester compound (D) can be used in an amount of about 30 parts by weight or less, based on about 100 parts by weight of the base resin including resins (A) and (B). In some embodiments, the aromatic phosphoric ester compound (D) may not be present (0 amount) or may be used in an amount greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, based on about 100 parts by weight of the base resin including resins (A) and (B). If the aromatic phosphoric ester compound is used in an amount more than about 30 parts by weight, the mechanical properties may decrease.

The resin composition according to the present invention may further include other additives depending on its use. Examples of such additives may include without limitation plasticizers, lubricants, heat stabilizers, anti-dripping agents, antioxidants, compatibilizers, light-stabilizers, pigments, dyes, inorganic fillers and the like. The additives can be used alone or in combination with one another. Examples of the inorganic fillers may include asbestos, glass fibers, talc, ceramic, sulfates, and the like, and combinations thereof. The additives can be added in an amount of about 30 parts by weight or less, based on about 100 parts by weight of the base resin including (A) and (B). In some embodiments, the additives may not be present (0 amount) or may be used in an amount greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, based on about 100 parts by weight of the base resin including resins (A) and (B).

The flame retardant resin composition according to the present invention can be prepared by a conventional process. For example, all the components and additives can be mixed together and extruded through an extruder and can be prepared in the form of pellets. The pellets can be molded by a conventional method to form housings of electric/electronic goods such as televisions, washing machines, telephones, audio systems, video players, CD players and the like, and inner/outer parts of office automation equipment.

The invention may be better understood by reference to the following examples which are intended for the purpose of illustration and are not to be construed as in any way as limiting the scope of the present invention, which is defined in the claims appended hereto.

EXAMPLES

Each component used in the following examples and comparative examples are as follows.

(A) Aromatic Vinyl Resin

Rubber-reinforced styrenic resin HG-1760S manufactured by Cheil Industries Inc. of South Korea is used.

(B) Polyphenylene Ether (PPE) Resin

Poly(2, 6-dimethyl-phenylether) manufactured by Mitsubishi Engineering-Plastics Corp. of Japan (product name: PX-100F) having several tens μm of an average diameter in the form of powder is used.

(c1) Cyclic t-butyl Phosphonate

Aluminum chloride (130 g, 1.0 mol) and dichloromethane (200 mL) are added into a vessel and stirred with dropwise addition of phosphorus trichloride (140 g, 1.0 mol) at room temperature for 1 hour. The temperature of the vessel is lowered to 0° C. and t-butyl chloride (93 g, 1.0 mol) is dropwise added with stirring under a nitrogen atmosphere. After the completion of the dropping, the mixture is further stirred for 12 hours at room temperature to form a slurry. The resulting mixture is added with chloroform (200 mL), stirred and followed by addition of diluted HCl (400 mL) and stirring. Then the organic layer is taken and evaporated under reduced pressure to obtain t-butyl phosphonic dichloride. Then, an equivalent of the t-butyl phosphonic dichloride and 2,2-methyl-propanediol respectively, two equivalent of triethylamine, and 200 ml of toluene are charged into a vessel and refluxed at 130° C. for 10 hours. After the completion of the reaction, ethyl acetate (100 ml) and water (200 ml) are added to the vessel and stirred until solid disappears. Then the organic layer is taken and evaporated under reduced pressure to obtain cyclic t-butyl phosphonate with 99% or more purity and 50% yield.

(c2) Cyclic Phenyl Phosphonate

Cyclic phenyl phosphonate with 99% or more purity and 50% yield is obtained by the same procedure as (c1) except using phenyl chloride instead of t-butyl chloride.

(c3) Cyclic Methyl Phosphonate

Cyclic methyl phosphonate with 99% or more purity and 50% yield is obtained by the same procedure as (c1) except using methyl chloride instead of t-butyl chloride.

(c4) Cyclic n-butyl Phosphonate

Cyclic n-butyl phosphonatet-butylchloride with 99% or more purity and 50% yield is obtained by the same procedure as (c1) except using n-butyl chloride instead of t-butyl chloride.

(D) Aromatic Phosphoric Ester Compound

Tetra-2,6-dimethyl phenyl resorcinol diphosphate made by Daihachi Chemical Industry Co., Ltd. of Japan (product name: PX-200) is used.

Examples 1-4

The components as shown in Table 1 are mixed and the mixture is extruded at 200 to 280° C. with a conventional twin-screw extruder into pellets. The pellets are dried at 80° C. for 2 hours and then molded into test specimens for evaluating flame retardancy using an injection molding machine at 180 to 280° C. and mold temperature of 40 to 80° C. The flame retardancy is measured in accordance with UL 94 VB for a thickness of 1/8". Impact strength is measured in accordance with ASTM D 256 for a thickness of 1/8". The melt index is measured according to ASTM D1238 (200° C., 5 kg).

Comparative Examples 1-6

Comparative Examples 1-6 are prepared in the same manner as in Examples 1-4 except that the compositions used are as set forth in Table 1 below. The results are shown in Table 1.

TABLE 1

|  |  | Examples | | | | Comparative examples | | | | | |
|---|---|---|---|---|---|---|---|---|---|---|---|
|  |  | 1 | 2 | 3 | 4 | 1 | 2 | 3 | 4 | 5 | 6 |
| (A) HIPS | | 85 | 85 | 85 | 90 | 85 | 85 | 85 | 85 | 85 | 70 |
| (B) PPE | | 15 | 15 | 15 | 10 | 15 | 15 | 15 | 15 | 15 | 30 |
| (C) | (c1) | 20 | 10 | 5 | 20 | — | — | — | — | — | 20 |
|  | (c2) | — | — | — | — | — | — | 20 | — | — | — |
|  | (c3) | — | — | — | — | — | — | — | 20 | — | — |
|  | (c4) | — | — | — | — | — | — | — | — | 20 | — |
| Aromatic phosphoric ester | | — | — | 15 | — | 20 | 15 | — | — | — | — |
| UL94 flame retardancy (1/8") | | V-0 | V-1 | V-1 | V-1 | Fail | Fail | V-1 | V-1 | Fail | V-0 |
| IZOD (kgf · cm/cm) | | 8.8 | 8.1 | 7.0 | 7.5 | 7.0 | 7.3 | 8.6 | 7.9 | 8.2 | 7.8 |
| Melt Index (200° C.) | | 7.9 | 8.1 | 7.8 | 8.4 | 8.1 | 7.6 | 7.8 | 7.9 | 8.0 | 5.1 |

As shown above, the resin compositions employing cyclic t-butyl phosphonate show higher flame retardancy and impact strength at a thickness of 1/8" than those using aromatic phosphoric ester compound only.

Also, Example 1 and Comparative Examples 3 to 5 show that the flame retardancy and the impact strength for a thickness of 1/8" are better when using cyclic t-butyl phosphonate compound than when using cyclic phosphonate compounds having a phenyl, methyl, or n-butyl group instead of t-butyl group.

In addition, the fluidity is excellent in Examples 1 and 4 in which less than 20 parts by weight of polyphenylene ether is used, while the fluidity is significantly poor in Comparative Example 6 in which polyphenylene ether is used in an amount more than 20 parts by weight.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of That which is claimed is:

1. A non-halogen flameproof resin composition comprising:
   a base resin comprising (A) about 80 to about 99% by weight of an aromatic vinyl resin, and (B) about 1 to about 20% by weight of a polyphenylene ether; and
   (C) about 0.5 to about 30 parts by weight of a cyclic t-butyl phosphonate compound, based on about 100 parts by weight of the base resin comprising (A) and (B).

2. The non-halogen flameproof resin composition of claim 1, wherein said aromatic vinyl resin is a polymer comprising a rubber and an aromatic monoalkenyl monomer.

3. The non-halogen flameproof resin composition of claim 1, wherein:
   said aromatic vinyl resin is a polymer comprising a rubber, aromatic monoalkenyl monomers and monomers polymerizable with said aromatic monoalkenyl monomers; and
   said polymerizable monomers are selected from the group consisting of alkyl ester monomers, unsaturated nitrile monomers and mixtures thereof.

4. The non-halogen flameproof resin composition of claim 1, wherein said polyphenylene ether (B) is poly(2,6-dimethyl-1,4-phenylene)ether.

5. The non-halogen flameproof resin composition of claim 1, wherein said cyclic t-butyl phosphonate compound (C) is represented by the following chemical formula 1:

[Chemical Formula 1]

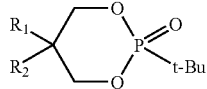

wherein $R_1$ and $R_2$ are each independently hydrogen, $C_1$-$C_6$ alkyl or $C_6$-$C_{10}$ aryl.

6. The non-halogen flameproof resin composition of claim 1, further comprising about 30 parts by weight or less of (D) an aromatic phosphoric ester compound, based on about 100 parts by weight of the base resin.

7. The non-halogen flameproof resin composition of claim 6, wherein said aromatic phosphoric ester compound (D) is represented by the following chemical formula 2:

[Chemical Formula 2]

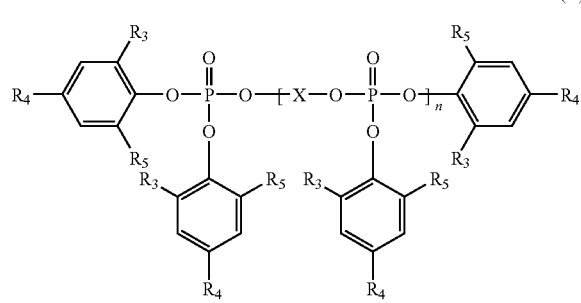

(II)

wherein $R_3$, $R_4$, and $R_5$ are each independently hydrogen or $C_1$-$C_4$ alkyl, X is $C_6$-$C_{20}$ aryl or $C_1$-$C_4$ alkyl-substituted $C_6$-$C_{20}$ aryl, and n is about 0 to about 4.

8. The non-halogen flameproof resin composition of claim 1, further comprising one or more additives selected from the group consisting of plasticizers, lubricants, heat stabilizers, anti-dripping agents, antioxidants, compatibilizers, light-stabilizers, pigments, dyes, inorganic fillers and mixtures thereof, in an amount of about 30 parts by weight or less, based on about 100 parts by weight of the base resin.

9. A molded article molded from the non-halogen flameproof resin composition of claim 1.

* * * * *